(12) United States Patent
Ito

(10) Patent No.: US 11,277,409 B2
(45) Date of Patent: Mar. 15, 2022

(54) AUTHENTICATION SERVER, SYSTEM, AND METHOD THAT ALLOW CLIENT DEVICE TO LOG INTO CLIENT DEVICE AND/OR TARGET SERVICE

(71) Applicant: Konica Minolta Business Solutions U.S.A., Inc., San Mateo, CA (US)

(72) Inventor: Hiroyasu Ito, Foster City, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 235 days.

(21) Appl. No.: 16/587,950

(22) Filed: Sep. 30, 2019

(65) Prior Publication Data

US 2021/0099448 A1    Apr. 1, 2021

(51) Int. Cl.
H04L 29/06    (2006.01)

(52) U.S. Cl.
CPC ........ H04L 63/0884 (2013.01); H04L 63/083 (2013.01); H04L 63/0861 (2013.01); H04L 63/0876 (2013.01); H04L 63/105 (2013.01)

(58) Field of Classification Search
CPC . H04L 63/0884; H04L 63/083; H04L 63/105; H04L 63/0876; H04L 63/0861; H04L 63/102
USPC .......................................................... 726/7
See application file for complete search history.

(56) References Cited

U.S. PATENT DOCUMENTS

| 9,075,741 B2* | 7/2015 | Koker ................. G06F 11/1048 |
| 2015/0350905 A1* | 12/2015 | Suzuki .................... H04L 63/08 726/7 |
| 2017/0193723 A1* | 7/2017 | Park ........................ E05B 49/00 |
| 2019/0311336 A1* | 10/2019 | Kim ........................ G06Q 20/36 |
| 2020/0134043 A1* | 4/2020 | Demoor ............... G06F 16/134 |

OTHER PUBLICATIONS

Implementation of an Advanced Authentication Method within Microsoft Active Directory Network Services, Kadlec et al, Sep. 2010 (Year: 2010).*

* cited by examiner

*Primary Examiner* — Jahangir Kabir
(74) *Attorney, Agent, or Firm* — Osha Bergman Watanabe & Burton LLP

(57) ABSTRACT

An authentication server that connects a client device and a target server via a first network. The authentication server includes: a storage and a processor. The storage stores user-specific information that includes a plurality of data items. The processor: upon receiving an authentication request including a user ID and a user password, an authentication ID, a biometric device ID unique to a user, or biometric data of a user, identifies a corresponding credential data of the user; determines which of the items in the user-specific information will be sent to the client device; and returns the determined items to the client device, and causes the client device to store the determined items as cache data used for logging into at least one of the client device and the target service, wherein the client device and the target server have given a login authority to the user.

17 Claims, 11 Drawing Sheets

FIG. 9

| ID | User property | | | | | User Authority | Account status | | Certificate | | | | | Credential Information | | | | | | | Authentication information | | |
|---|---|---|---|---|---|---|---|---|---|---|---|---|---|---|---|---|---|---|---|---|---|---|---|---|
| | | | | | | | | | | | | | | | AD | | Ext1 | | Ext2 | | Bio authenticator | | |
| Auth ID | User name | email | division | location | role | (2) | Valid | Expire date | Client 1 MFP | Client 2 Door | (3) | service 1 | service 2 ... | User name | AD PW | Ext ID | Ext PW | Ext ID | Ext PW | Fingerprint | Face template | 2nd authenticator PIN |
| 1 | Abc Defgh | (1) | HR | Tokyo | Manager | 1/1/1/1 | Yes | 9/30/2019 | x | | x | | | Miko | 1234 | Miko1 | 1234 | MM12 | 5678 | x | x | 3543 |
| 2 | Bcd Efgh | (1) | ITSupport | Tokyo | IT admin | 1/1/0/1 | Yes | 9/30/2019 | | x | x | | | Hiro | 5678 | Hiro2 | 5678 | HJ34 | 9012 | x | | 4583 |
| 3 | Cde Fghij | (1) | ITSupport | Nagoya | IT admin | 1/1/0/1/1 | Yes | 12/28/2020 | | | x | | | Subra | 9012 | Subra3 | 9012 | SB44 | 3456 | x | x | 5792 |
| 4 | Def Ghijk | (1) | Accounting | Nagoya | Standard user | 0/1/1/1/0 | No | 12/28/2020 | | x | | | | Marc | 3456 | Marc4 | 3456 | MC45 | 1234 | | | 1549 |
| 5 | Efg. Hijk | (1) | R&D | Osaka | Standard user | 0/1/1/1 | Yes | 9/30/2019 | x | | x | x | | Taka | 1adwe | Taka2 | jhsbe | TK14 | rj3j | | x | 2645 |
| 6 | .. | | | | | | | | | | | | | | | | | | | | | |
| 7 | .. | | | | | | | | | | | | | | | | | | | | | |
| 8 | .. | | | | | | | | | | | | | | | | | | | | | |
| 9 | | | | | | | | | | | | | | | | | | | | | | |
| 10 | | | | | | | | | | | | | | | | | | | | | | |
| 11 | | | | | | | | | | | | | | | | | | | | | | |
| 12 | | | | | | | | | | | | | | | | | | | | | | |
| 13 | | | | | | | | | | | | | | | | | | | | | | |
| 14 | | | | | | | | | | | | | | | | | | | | | | |

(1): user1@konimino.com (2): RM/Office/Storage/Ext1/Ext2 (3): Client 3 Server room
*1: enable/ 0:disable

FIG. 10

| | ID | User property | | | | | User Authority | Account status | | Credential Information | | | | | | Authentication Information | | |
|---|---|---|---|---|---|---|---|---|---|---|---|---|---|---|---|---|---|---|
| | | | | | | | | | | AD | | Ext App1 | | Ext App2 | | Bio authenticator | | 2nd authenticator |
| | AuthID | User name | email | division | location | role | | Valid | Expire date | User name | AD pass | Ext ID | Ext PW | Ext ID | Ext PW | Fingerprint | Face template | PIN |
| UserPC | x | x | | | | | x | x | x | x | x | x | x | x | x | | | |
| Door Office | x | | | | | | x | x | x | | | | | | | | x | |
| Door ServerRoom | x | | | | | | x | x | x | | | | | | | | | x |
| MFP | x | x | x | | | | x | x | x | x | x | x | x | x | x | x | | |
| Cellular Phone | x | x | x | | | | x | x | x | x | x | x | x | x | x | x | | |

FIG. 11

| | User Authority | | | Credential Information | | | | | | | | Authentication Information | | |
|---|---|---|---|---|---|---|---|---|---|---|---|---|---|---|
| | | | | | AD | | Ext 1 | | Ext 2 | | Bio authenticator | | 2nd authenticator |
| | ServerRM/Office/Stage/Ext1/Ext2 | Cashe expire period | Cash amount | User name | AD PW | Ext ID | Ext PW | Ext ID | Ext PW | Fingerprint | Face template | PIN |
| Client1 MFP | 1/1/1/1/1 | 1 month | 50 person | x | x | x | x | x | x | x | x | x |
| Client2 Door | 1/1/0/1/1 | 6 months | 250 person | | | | | x | x | | x | x |
| Client3 Server room | 1/1/0/1/1 | 1 month | 4096 KB | | | | | x | x | x | x | x |
| Client4 PC individual | 0/1/1/1/0 | 1 month | 2 person | x | x | x | x | x | x | x | | x |
| Client5 PC shared | 0/1/1/1/1 | 1 month | 10 person | x | x | x | x | x | x | x | x | |
| .. | | | | | | | | | | | | |
| .. | | | | | | | | | | | | |

FIG. 13A

Client1  MFP

| | ID | | User property | | | | | Account status | | Credential Information | | | | Authentication information | | |
|---|---|---|---|---|---|---|---|---|---|---|---|---|---|---|---|---|
| Cash # | Auth ID | User name | email | division | location | role | Valid | Expire date | User name | AD PW | Ext ID | Ext PW | Fingerprint | Face | PIN |
| 1 | 1 | Abc Defgh | user1@konimino.com | HR | Tokyo | Manager | Yes | 9/30/2019 | Miko | 1234 | Mik01 | 5678 | x | | 3543 |
| 2 | 2 | Bcd Efgh | user1@konimino.com | ITSupport | Tokyo | IT admin | Yes | 9/30/2019 | Hiro | 5678 | Hiro2 | 9012 | x | | 4583 |
| 3 | 5 | Ef G. Hijk | user1@konimino.com | R&D | Osaka | Standard user | Yes | 9/30/2019 | Taka | 1aowe | Taka2 | rij3j | x | x | 2645 |
| .. | | | | | | | | | | | | | | | |
| .. | | | | | | | | | | | | | | | |
| 50 | | | | | | | | | | | | | | | |

FIG. 13B

Client2  Door Module

| | ID | | User property | | | | | Account status | | Credential Information | | | | Authentication information | | |
|---|---|---|---|---|---|---|---|---|---|---|---|---|---|---|---|---|
| Cash # | Auth ID | User name | email | division | location | role | Valid | Expire date | User name | AD PW | Ext ID | Ext PW | Face template | PIN |
| 1 | 3 | Cde Fghij | user1@konimino.com | ITSupport | Nagoya | IT admin | Yes | 12/28/2020 | Subra | 9012 | Subra3 | 3456 | x | 5792 |
| 2 | 5 | Ef G. Hijk | user1@konimino.com | R&D | Osaka | Standard user | Yes | 9/30/2019 | Taka | 1aowe | Taka2 | jhsbe | x | 2645 |
| 3 | 2 | Bcd Efgh | user1@konimino.com | ITSupport | Tokyo | IT admin | Yes | 9/30/2019 | Hiro | 5678 | Hiro2 | 9012 | x | 4583 |
| .. | | | | | | | | | | | | | | | |
| .. | | | | | | | | | | | | | | | |
| 250 | | | | | | | | | | | | | | | |

AUTHENTICATION SERVER, SYSTEM, AND METHOD THAT ALLOW CLIENT DEVICE TO LOG INTO CLIENT DEVICE AND/OR TARGET SERVICE

BACKGROUND

Technical Field

The present invention generally relates to an authentication server, system, and method that allow a client device to log into a client device and/or target service.

Description of Related Art

Integrated security services authenticate and manage multiple devices on a network. With such services, users can integrally manage various devices such as security doors, multi-function peripherals (MFPs), cellular phones, and personal computers (PCs) on a single network. Users can also integrally manage various services on the network, such as cloud services, using those devices.

However, if any of the servers that provide the services are down for whatever reason, the users may be unable to access some or all of the devices/services on the network. Although a one-time password (OTP) can be used for each device to cope with such a situation, doing so increases the workload on the servers and reduces user-friendliness of the services. On the other hand, using one common OTP lowers the security level of the devices. Although cache data saved in the devices can be used for authenticating users, cache amounts are often restricted due to hardware configurations of the devices and the like; as a result, some users may be unable to use the cache data in certain devices, particularly if the devices are used by multiple people and require large cache amounts, such as security doors and MFPs.

SUMMARY

One or more embodiments of the invention provide an authentication server, system, and method that effectively manage cache data to be saved in a client device and used for requesting authentication to a target server.

One or more embodiments provide an authentication server that connects a client device and a target server via a first network and provides the client device with data for logging into at least one of the client device and a target service provided by the target server, the authentication server comprising: a storage that stores user-specific information acquired from at least one of the client device and the target server, wherein the user-specific information includes a plurality of data items comprising: an authentication ID; user property data; user authority data indicating a user authority to access the client device or the target service; and credential data used for authentication; and a processor that: upon receiving from the client device an authentication request including a user ID and a user password, an authentication ID, a biometric device ID unique to a user, or biometric data of a user, identifies a corresponding credential data of the user; determines which of the items in the user-specific information will be sent to the client device; and returns the determined items to the client device, and causes the client device to store the determined items as cache data used for logging into at least one of the client device and the target service, wherein the client device and the target server have given a login authority to the user.

One or more embodiments provide an authentication system comprising: a client device; a biometric authentication device connected to the client device; and an authentication server that manages authentication for logging into at least two or more of the client device and a target service provided by a target server via a first network, an authentication server comprising; a storage that stores a plurality of credential data for the authentication acquired from at least one of the client device and the target server; and a processor that: upon receiving from the client device an authentication request, identifies a corresponding credential data; and returns the corresponding credential data to at least one of the biometric authentication device and the client device, wherein at least one of the biometric authentication device and the client device stores or updates cache data used for logging into at least one of the client device and the target service, upon receiving the credential data from the authentication server, wherein a cache amount of each of the biometric authentication device and the client device is set based on device-attribute information of the client device.

One or more embodiments provide an authentication method using an authentication system that comprises a client device, a biometric authentication device connected to the client device, and an authentication server comprising a processor and a storage, and managing authentication for logging into at least two or more of the client device and a target service provided by a target server via a first network, the method comprising: storing, in the storage, a plurality of credential data for the authentication acquired from at least one of the client device and the target server; upon receiving from the client device an authentication request, identifying, by the processor, a corresponding credential data; returning, by the processor, the corresponding credential data to at least one of the biometric authentication device and the client device; storing or updating, by at least one of the biometric authentication device and the client devices, the cache data used for logging into at least one of the client device and the target service, upon receiving the credential data from the authentication server; and setting a cache amount of each of the biometric authentication device and the client device based on device-attribute information of the client device.

BRIEF DESCRIPTION OF DRAWINGS

FIG. 9 shows a credential database of user-specific information stored in the authentication server according to one or more embodiments.

FIG. 10 shows login requirement that client devices need for logging into the client devices and/or target services according to one or more embodiments.

FIG. 11 shows client-specific information indicating which items of the user-specific information will be sent to the client devices according to one or more embodiments.

FIG. 13A is a table showing cache data stored in a multi-function peripheral (MFP) according to one or more embodiments.

FIG. 13B is a table showing cache data stored in a door module according to one or more embodiments.

DETAILED DESCRIPTION

Figure 1:
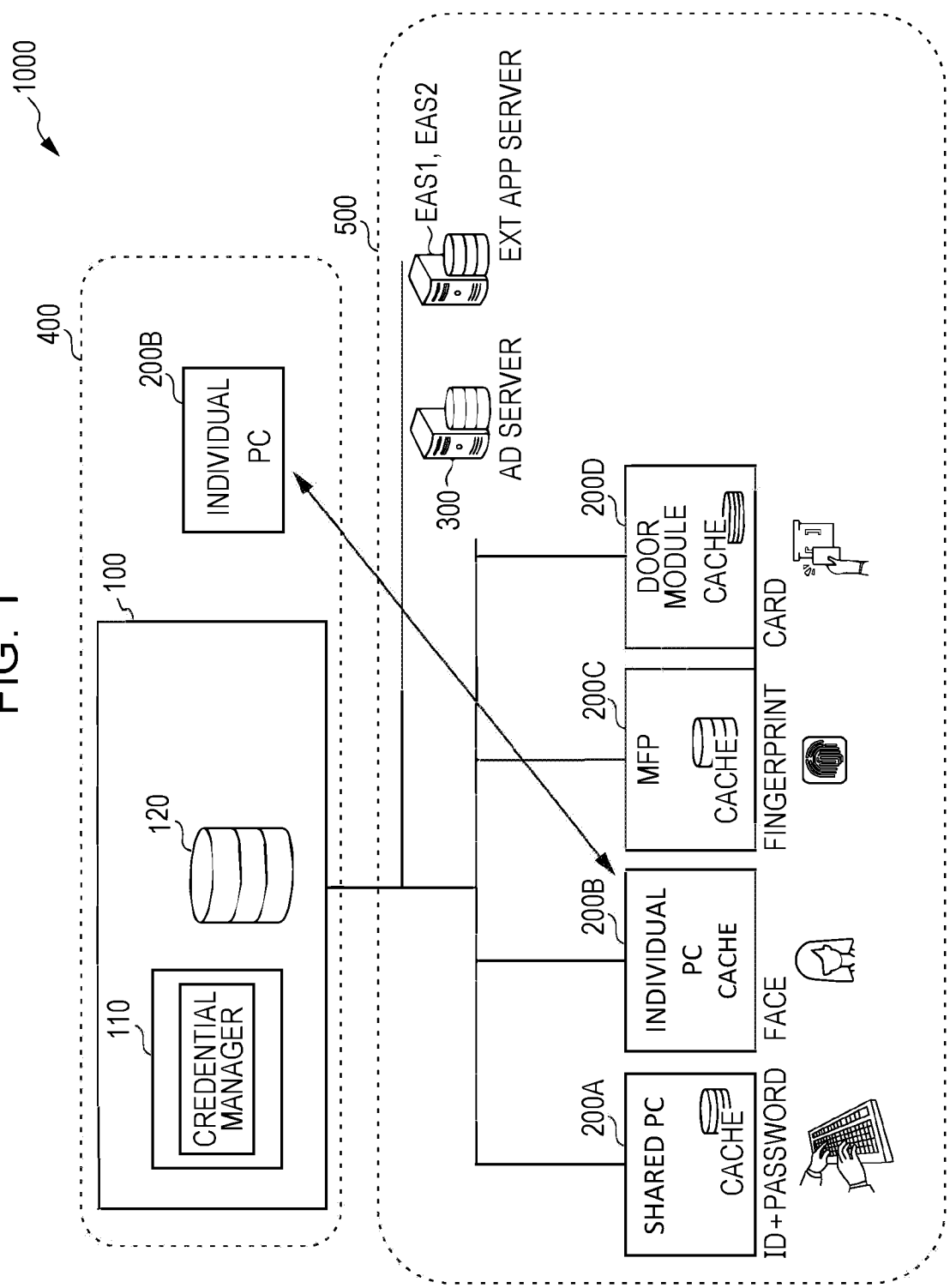
FIG. 1 is a schematic view of an authentication system according to one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

[Configuration of Authentication System]

One or more embodiments of the invention provide an authentication system comprising an authentication server that manages and controls cache data to be saved in a plurality of client devices. The client devices use the cache data for logging into at least one of the client devices and/or target services provided by the target server, which devices/servers have given a login authority to a user of the client devices.

FIG. 1 shows a schematic view of an authentication system 1000 according to one or more embodiments. The authentication system 1000 comprises an authentication server 100 that provides a plurality of client devices 200 (200A, 200B, 200C, 200D, etc.) with data for logging into the client devices 200 and/or target services provided by the target servers, e.g., an active directory (AD) server 300 and external application servers EAS1, EAS2. The authentication server 100 may be a cloud server. The client devices 200, AD server 300, and external application servers EAS1, EAS2 are connected to the authentication server 100 via a communication network 400. The communication network 400 may be the internet. The client devices 200, AD server 300, and external application servers EAS1, EAS2 are connected to one another via a local area network (LAN) 500. In one or more embodiments, the external application servers EAS1, EAS2 is on the communication network 400 but on another local area network different from 500.

Each of the aforementioned components of the authentication system 1000 will be described below.

[Configuration of Authentication Server]

Figure 2:
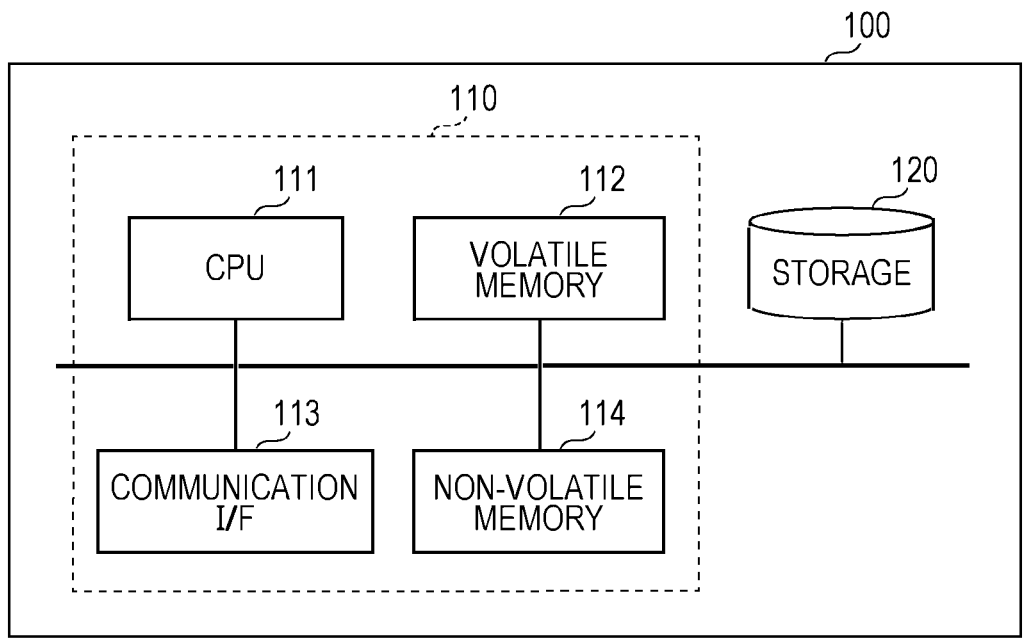
FIG. 2 is a hardware diagram of an authentication server according to one or more embodiments.

FIG. 2 shows a hardware diagram of the authentication server 100 according to one or more embodiments. The authentication server 100 comprises a processor 110 and a storage 120. The processor 110 comprises a central processing unit (CPU) 111, volatile memory 112, communication interface (IF) 113, and non-volatile memory 114.

The volatile memory 112 may be random access memory (RAM), cache memory, etc. The communication I/F 113 is connected to the communication network 400 to communicate with other devices also connected to the communication network 400. The non-volatile memory 114 may be read only memory (ROM), flash memory or hard disk, etc.

The hardware configuration of the processor 110 as shown in FIG. 2 may also be applicable to the AD server 300 and external application servers EAS1, EAS2, although various other hardware configurations are possible within the scope of the invention.

The storage 120 may be a non-volatile memory such as hard disks or flash memories, etc. The storage 120 of one or more embodiments may store: a credential database of user-specific information (to be described later with reference to FIG. 9); device-attribute information and user-attribute information (to be described later); login requirement (to be described later with reference to FIG. 10); and client-specific information (to be described later with reference to FIG. 11).

[Configuration of Client Devices]

According to one or more embodiments, each of the client devices 200 saves certain items of the user-specific information sent from the authentication server 100 as cache data, and sends an authentication request including the cache data to the target servers 300, EAS1, EAS2. The authentication request may include a user ID and a user password, authentication ID, or biometric data of a user.

As shown in FIG. 1, the client device 200 may be a shared personal computer (PC) 200A, individual PC 200B, multi-function peripheral (MFP) 200C, and door module 200D. Among them, the individual PC 200B can be brought outside of a local network environment, in one or more embodiments. Although not illustrated, the client device 200 may also be a cellular phone, various kinds of Internet of Things (IoT) devices, and other portable terminals. In one or more embodiments, at least one of the client devices 200 is a biometric authentication device that is connected to another client device 200 (e.g., the MFP 200C) and obtains the biometric data for identifying a user. The biometric authentication device may be a wristband-type device that obtains a body temperature and/or a pulse, as the biometric data. The biometric authentication device may also be a cellular phone that has a face authentication function to obtain and use binary data of face image, and/or a fingerprint authentication function to obtain and use binary data of fingerprint, as the biometric data.

Figure 3:
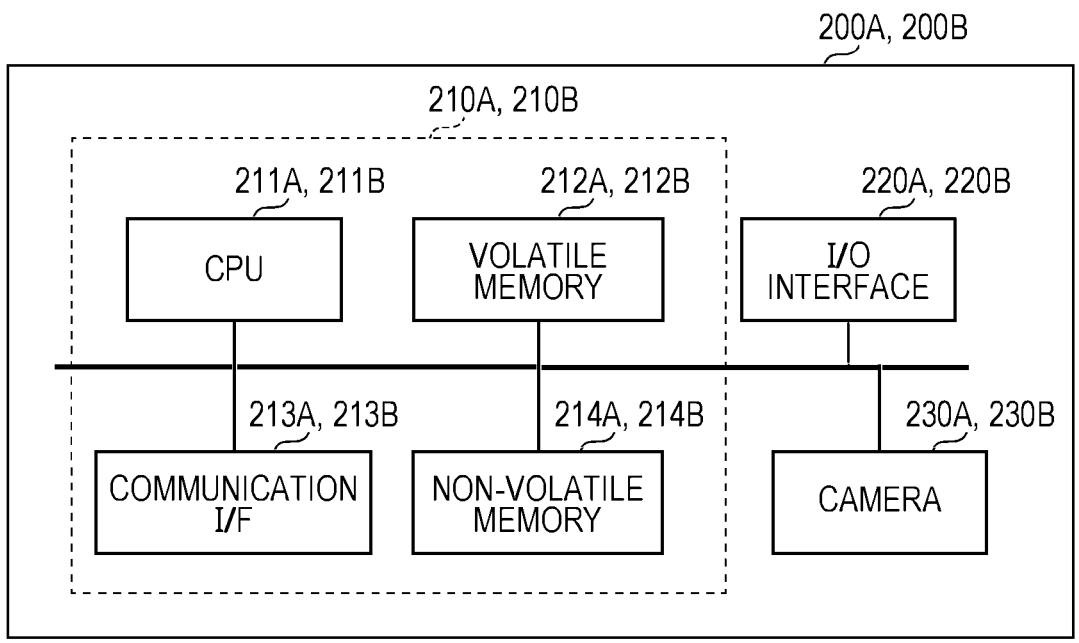
FIG. 3 is a hardware diagram of a client device according to one or more embodiments.

FIG. 3 is a hardware diagram of the shared PC 200A according to one or more embodiments. The shared PC 200A comprises a processor 210A comprising a CPU 211A, volatile memory 212A, communication interface 213A, and non-volatile memory 214A, each of which may have similar configurations to those of the authentication server 100 illustrated in FIG. 2. The volatile memory 212A may be cache memory that saves predetermined "data items" (or simply "items") of the user-specific information (e.g., authentication ID, user property data, user authority data, account status data, credential data, etc., to be described later) received from the authentication server 100 as the cache data. In one or more embodiments, the non-volatile memory 214A can be used as the cache memory.

The shared PC 200A further comprises an input/output (I/O) interface 220A that may include a keyboard, mouse, and display functions such as a touch panel, and a camera 230A that takes an image of a user face to obtain binary data of face image.

The individual PC 200B may have the same or substantially similar configuration as that of the shared PC 200A.

Figure 4:
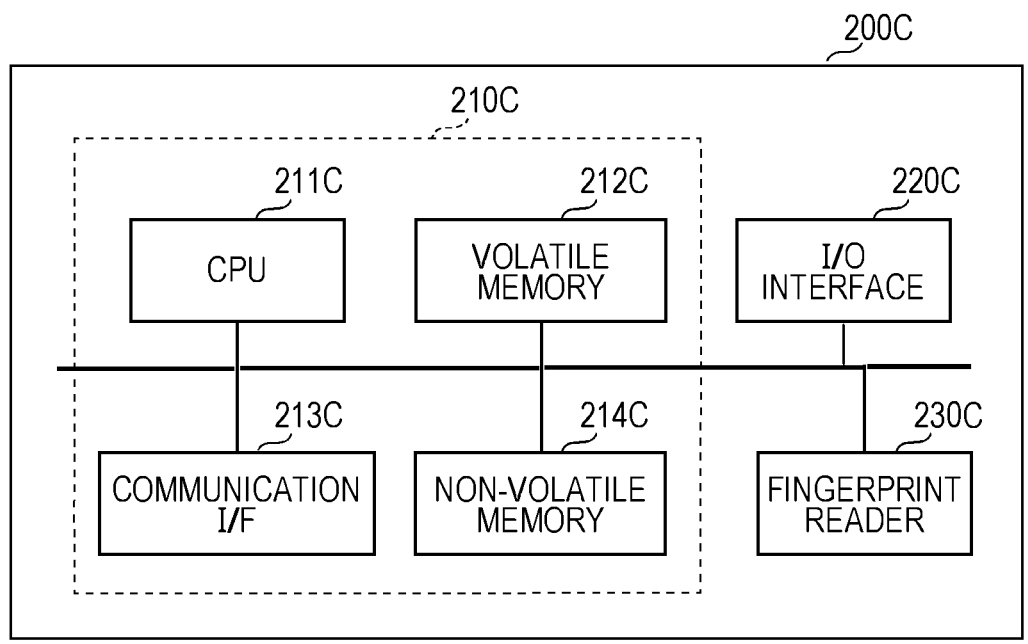
FIG. 4 is a hardware diagram of another client device according to one or more embodiments.

FIG. 4 is a hardware diagram of the MFP 200C according to one or more embodiments. The MFP 200C comprises a processor 210C and I/O interface 220C, which may have similar configurations as those of the processor 210A and I/O interface 220A illustrated in FIG. 3. Furthermore, the MFP 200C comprises a fingerprint reader 230C that digitally scans a user fingerprint to obtain a unique pattern as binary data.

Figure 5:
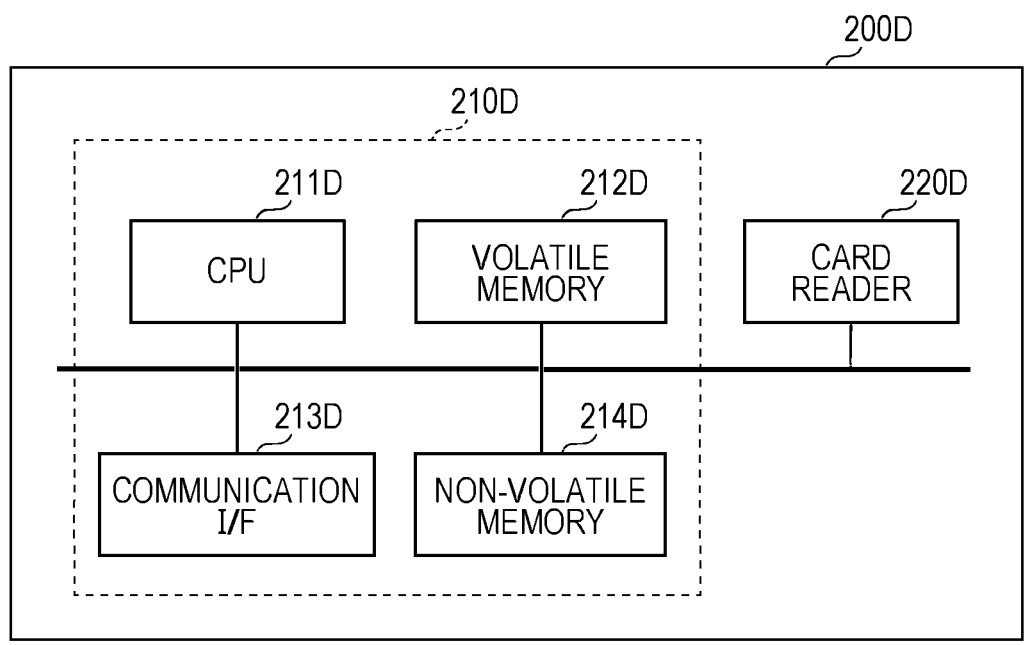
FIG. 5 is a hardware diagram of another client device according to one or more embodiments.

FIG. 5 is a hardware diagram of the door module 200D according to one or more embodiments. The door module 200D comprises a processor 210D, which may have similar configuration to that of the processor 210A illustrated in FIG. 3. Furthermore, the door module 200D comprises a card reader 220D that scans an integrated circuit (IC) card to obtain authentication data recorded in the card.

In one or more embodiments, the door module 200D may be composed as a sensor such as an image sensor that takes images of visitors and transmits the images to a not-illustrated server that comprises a processor including a cache memory.

[AD Server]

The AD server 300 provides each of the client servers 200 with various services by enabling utilizing various programs/applications, for example, entering a security door gate, browsing confidential data, etc.

The AD server 300 synchronizes with the authentication server 100 and provides the authentication server 100 with certain items of the user-specific information, as described later.

[External Application Servers]

The external application servers EAS1, EAS provides each of the client servers 200 with various services by enabling utilizing the various programs/applications, similarly to the AD server 300.

The external application servers EAS1, EAS2 require credential data (e.g., a user ID and password) different from that required by the AD server 300. The user ID may be a string of characters/numbers determined by a user to identify the user, e.g., nickname of a user. The user password may be a string of characters/numbers entered by a user to verify user's identity to the authentication system 1000.

[Authentication Processing]

Figure 6:
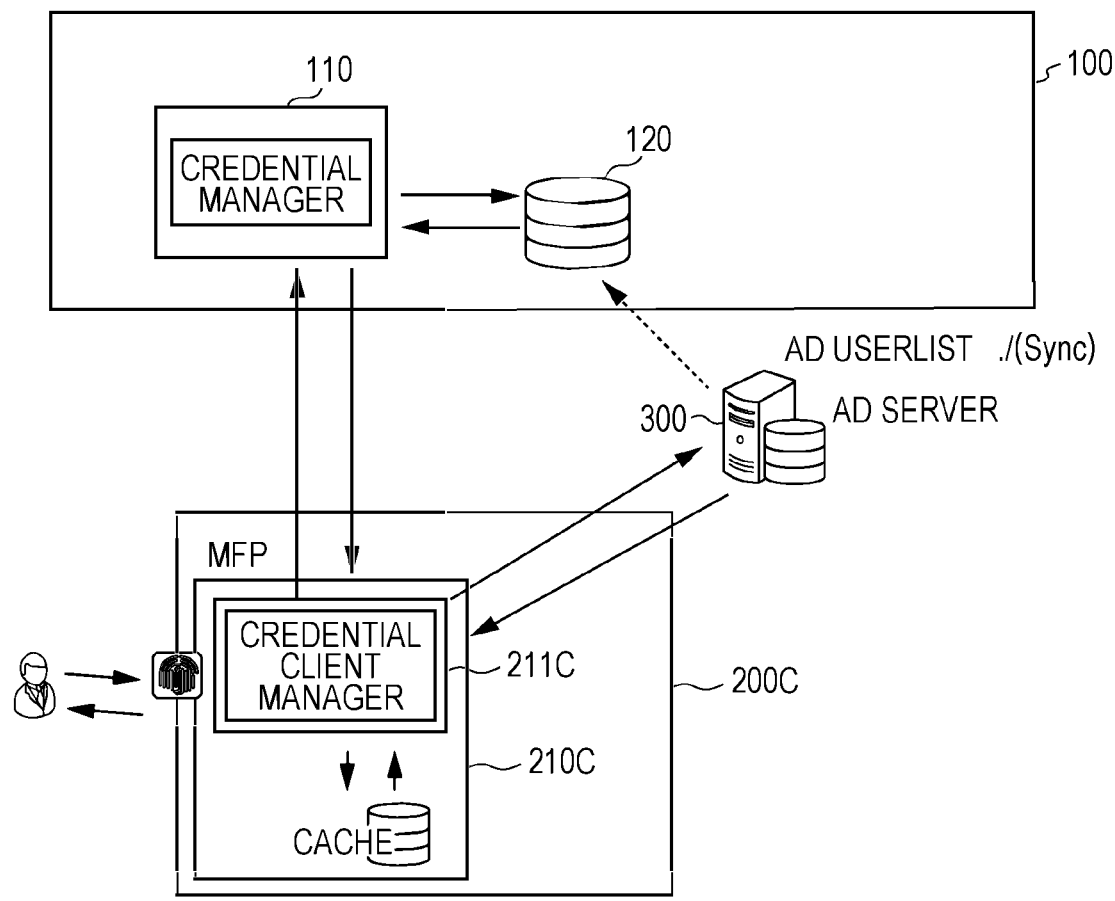
FIG. 6 is a diagram showing an authentication process using the authentication server according to one or more embodiments.

FIG. 6 is a diagram that explains an authentication process performed among the authentication server 100, MFP 200C, and AD server 300 according to one or more embodiments. Similar authentication processes can be performed using another client device 200, such as the shared PC 200A, individual PC 200B, and/or the external application servers EAS1, EAS2.

Figure 7:
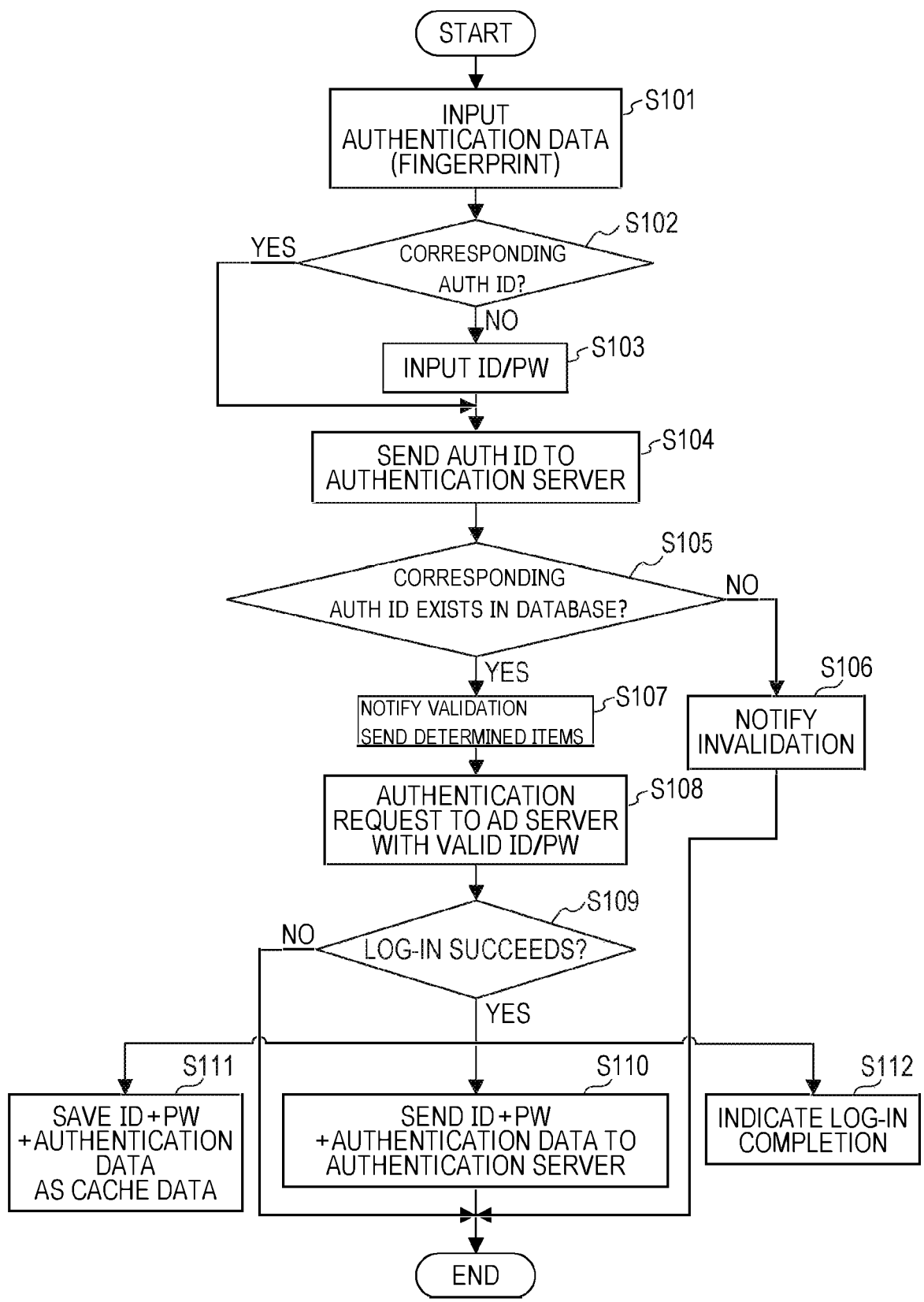
FIG. 7 is a flowchart showing an authentication method according to one or more embodiments.

When a user is logging into the MFP 200C or the target service provided by the AD server 300, the MFP 200C retrieves the user-specific information from the storage 120 of the authentication server 100, as described in detail later with reference to FIG. 7. When the authentication server 100 is disconnected from the communication network 400, the MFP 200C retrieves the user-specific information from the cache memory, as described in detail later with reference to FIG. 8. In one or more embodiments, each of the client devices 200 may acquire the user-specific information from the cache memory of another client device 200 on the same network including the LAN 500. Alternatively, each of the client devices 200 may request the another client device 200 to perform user authentication, and obtain the result of the user authentication.

[Authentication Processing]

The authentication process performed when a user is logging into the MFP 200C or the target service will be described with reference to FIG. 7. With respect to FIG. 7 and other figures that illustrate a process or flowchart, one or more of the steps may be omitted, repeated, and/or performed in a different order than the order shown in some embodiments; thus, the scope of the invention should not be considered limited to the specific arrangement of steps shown in the figures.

Prior to the authentication process, the authentication server 100 obtains, from at least one of the client devices 200 and the AD server 300, certain items of the user-specific information, such as authentication ID, user property data, user authority data, account status data, credential data, etc. In one or more embodiments, the credential data can be a user authority data.

First, a user inputs authentication data in the MFP 200C (Step S101). For example, when a user puts his/her finger on the fingerprint reader 230C, the fingerprint reader 230C scans a user fingerprint to obtain a unique pattern as binary data, and the processor 210C saves the binary data of fingerprint in the volatile memory 212C. Then, the processor 210C searches, in the volatile memory 212C, the authentication ID of the user corresponding to the authentication data, i.e., the binary data of fingerprint (Step S102). Upon identifying the authentication ID of the user (Step S102: Yes), the processor 210C transmits the authentication ID of the user to the authentication server 100 (Step S104).

If the authentication ID of the user are not identified (Step S102: No), the processor 210C displays a registration screen on the display of the I/O interface 220C, and the user inputs the user ID and user password on the registration screen (Step S103).

Upon receiving the authentication ID of the user, the processor 210C transmits the authentication ID of the user to the authentication server 100 (Step S104).

The authentication server 100 acquired and stored in advance the certain items of the user-specific information in the storage 120. Upon receiving the authentication ID of the user from the MFP 200C, the processor 110 of the authentication server 100 searches, in the credential database in the storage 120, the credential data (e.g., user ID and user password) corresponding to the authentication ID of the user transmitted from the MFP 200C (Step S105).

If the corresponding credential data does not exist in the storage 120 (Step S105: NO), the processor 110 informs the MFP 200C that the authentication ID is invalid (Step S106).

If the corresponding credential data exists in the storage 120 (Step S105: YES), the processor 110 informs the MFP 200C that the authentication ID is valid (Step S107). At the same time, the processor 110 determines the items of the user-specific information, which will be saved as the cache data in the MFP 200C, and transfers the determined items of the user-specific information to the MFP 200C (Step S107). The processor 110 may previously store the items of the user-specific information, as the client-specific information, as illustrated in FIG. 11.

Upon the MFP 200C being informed that the authentication ID is valid, the processor 210C transmits an authentication request including the valid user ID and user password to the AD server 300 (Step S108).

Upon receiving the authentication request from the MFP 200C, the AD server 300 searches the corresponding credential data (e.g., user ID and user password) in the memory 312 (Step S109).

If the corresponding credential data does not exist, the AD server 300 prohibits the MFP 200C to log in (Step S109: NO), and the authentication process is terminated.

If the corresponding credential data exists, the AD server 300 allows the MFP 200C to log in (Step S109: YES), and informs the MFP 200C that the login succeeds.

Upon the MFP 200C being informed that the login succeeds, the processor 210C saves, as the cache data in the volatile memory 212C, the user-specific information, such as the set of credential data (e.g., user ID and user password) and authentication data (e.g., the binary data of fingerprint) (Step S111).

At the same time, the processor 210C transmits the user-specific information, such as the set of credential data and authentication data, to the authentication server 100 (Step S110). Upon receiving the user-specific information from the MFP 200C, the processor 110 registers or updates the user-specific information, such as the set of credential data, authentication data, and account status, in the credential database in the storage 120.

The processor 210C of the MFP 200C also indicates completion of login on the display of the I/O interface 220C (Step S112). Then the authentication process is terminated.

In one or more embodiments, the processor 110 of the authentication server 100 may previously store the login requirement indicating which items in the user-specific information the client devices 200 need for logging into the client devices 200 and/or target services, as described later with reference to FIG. 10.

In one or more embodiments, if the authentication ID of the user are not identified (Step S102: No) and the user ID and user password are input (Step S103), the user ID and user password that have been input are used in the subsequent steps instead of the authentication ID.

[Authentication Processing when Authentication Server is Disconnected]

Figure 8:
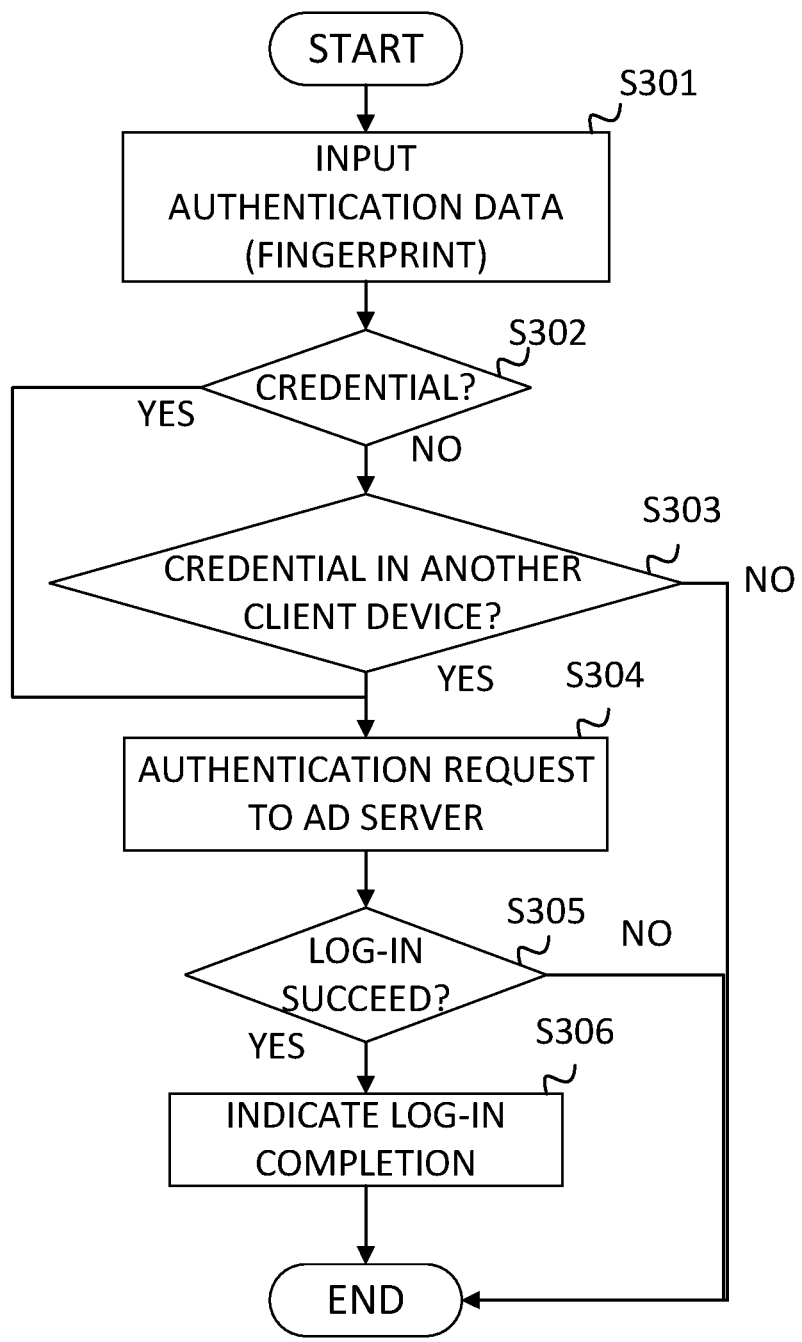
FIG. 8 is a flowchart showing an authentication method according to one or more embodiments.

Next, the authentication process performed when the authentication server 100 is disconnected from the communication network 400 will be described with reference to FIG. 8.

First, a user inputs authentication data (e.g., the binary data of fingerprint) in the MFP 200C (Step S301). Then, the processor 210C searches, in the cache memory of the volatile memory 212C, the credential data (e.g., user ID and user password) corresponding to the authentication data (Step S302).

Upon identifying the corresponding credential data (Step S302: YES), the processor 210C transmits an authentication request including the credential data to the AD server 300 (Step S304).

If the corresponding credential data does not exists in the cache memory of one of the client devices 200 (Step S302: NO), the processor 210C may search the credential data in the cache memory of another client device 200 (Step S303). If the corresponding credential data does not exists also in the cache memory of another client device 200 (Step S302: NO), the process is terminated. If the corresponding credential data exists in the cache memory of another client device 200 (Step S302: YES), the processor 210C executes Step S304 using the credential data acquired from another client device 200.

Upon receiving the authentication request from the MFP 200C, the AD server 300 searches, in the memory 312, the user-specific information corresponding the credential data (Step S305).

If the corresponding user-specific information does not exist (Step S305: No), the AD server 300 prohibits the MFP 200C to log in, and the authentication process is terminated.

If the corresponding user-specific information exists (Step S305: Yes), the AD server 300 allows the MFP 200C to log in (Step S305: YES), and the MFP 200C is informed that the login succeeds. Then the processor 210C indicates completion of login on the display of the I/O interface 220C (Step S210), and the authentication process is terminated.

[Credential Database]

FIG. 9 shows the credential database of the user-specific information stored in the storage 120 of the authentication server 100 according to one or more embodiments. The user-specific information comprises a plurality of data items unique to a user. In one or more embodiments, the items contain: authentication ID (a serial number of a user); user property data; user authority data; account status data; credential data; and authentication data.

The user property data may contain sub-items of: a user name; an email address; a division of a company to which a user belongs; a location where a user lives: and a user's role in a company.

The user authority data may indicate a user authority to access the client devices 200 and/or the target services including the door modules 200D at entrances of server rooms and offices, and the external application servers EAS1, EAS2. In one or more embodiments, the user authority data may define the user authority to access to the memory/storage of each of the client devices 200, such as the shared PC 200A, individual PC 200B, MFP 200C, and door module 200D.

The account status data may contain sub-items of validity/invalidity of user account and an expiration period of user account.

The credential data used for authentication may contain sub-item(s) of certificate or the user IDs and user passwords for logging into the client devices 200 and/or target services provided by the target servers 300, EAS1, EAS2, respectively.

The authentication data may contain biometric data for identifying a user, e.g., sub-items of the binary data of fingerprint, binary data of face image, and PIN code. In one or more embodiments, the binary data of fingerprint and binary data of face image function as first authenticators, and the PIN code functions as the second authenticator.

[Login Requirement]

FIG. 10 shows the login requirement that the client devices 200 need for logging into the client devices 200 and/or the target services according to one or more embodiments.

The login requirement may indicate which items of the user-specific information (e.g., authentication ID; user property data; account status data; credential data; and authentication data) are required for the client devices 200. For example, the login requirement may indicate the items required for the individual PC 200B ("User PC"), door modules 200D ("Door Office" and "Door Server Room"), MFP 200C ("MFP"), and cellular phone ("Cellular Phone").

In FIG. 10, the checked items (e.g., user property data) and sub-items (e.g., user name, email address, division, location, and role) indicated with "x" are required for logging into the client devices 200 and/or the target services. For example, the individual PC 200B ("User PC") needs the authentication ID, user property data (e.g., user name), user authority data, account status data, and credential data (e.g., user ID and user password). Meanwhile, the door modules 200D ("Door Office") needs only the authentication ID, user authority data, account status data, and authentication data (e.g., binary data of face image). The door modules 200D ("Door Server Room") may require similar items and sub-items to "Door Office," but does not require the binary data of face image, and requires the binary data of fingerprint and PIN code. The MFP 200C ("MFP") and cellular phone ("Cellular Phone") need, in addition to the items and sub-items that the individual PC 200B needs, the email address and the binary data of fingerprint.

Although not illustrated in FIG. 10, the login requirement may include certificate issued by the authentication server 100. The login requirement may be defined as necessary. For example, in the case where a user authentication is executed using the wristband-type device and/or an external authentication server connected to another network different from the LAN 500, only the authentication ID may be set as the login requirement.

[Client-Specific Information]

FIG. 11 shows the client-specific information to be stored as the cache data in the client devices 200 according to one or more embodiments.

The client-specific information may be determined based on least one of the device-attribute information and the user-attribute information.

The device-attribute information may include one or more of the following items: a kind of the client device (e.g., a door module, MFP, cellular phone, PC, and IoT device), device name, device location, security level, degree of importance of device, the number of users of device, frequency in use of device, time of use of device, and usage period of device.

The user-attribute information may include one or more of the following items: a user name, a division of a company to which a user belongs, and a role of a user in a company.

Furthermore, the device-attribute information and/or the user-attribute information may also include future prediction data of the above items. The future prediction data may be obtained by predicting future change of data of the above items. For example, the future prediction data of the frequency in use of device may be obtained by counting the frequency at plural points of time during a certain time period, making the counted values into a graph, and predicting from the graph a frequency at a certain point of time.

In one or more embodiments, the processor 110 may determine the cache amount based on the kind of client devices 200 and/or the login requirement. For example, the processor 110 may limit the cache amount of the door module 200D depending on restriction of hardware. The processor 110 may also limit the cache amount of the individual PC 200B more than the shared PC 200A and the MFP 200C, because the individual PC 200B can be taken outside of the local network environment and requires higher security level than that of the shared PC 200A and the MFP 200C, which are installed inside the office.

For example, in the client-specific information for the MFP 200C of Client 1, the cache amount is "50 person," user authority data is "ServerRoom/Office/Storage/EAS1/EAS2=1/1/1/1/1" (1: enable, 0: disable), and expiration period is 1 month. As the credential data, the user IDs and user passwords are required for logging into the MFP 200C and/or the target services. As the authentication data, the binary data of fingerprint, binary data of face image, and PIN code are required.

Meanwhile, in the client-specific information for the door module 200D of Client 2, the cache amount is "250 persons," which is larger than "50 persons" of the MFP 200C. This is because the door module 200D of Client 2 is expected to be used by more persons than the MFP 200C. The expiration period (6 months) in the door module 200D of Client 2 is longer than that (1 month) in the MFP 200C, because the items stored in the door module 200D of Client 2 are more limited than those stored in the MFP 200C, which requires less cache amount than that of the MFP 200C. Furthermore, in the client-specific information for the door modules 200D of Client 2, only the authentication data (e.g., the binary data of face image and PIN code) is required for logging into the door modules 200D and/or the target service provided by the target servers 300, EAS1, EAS2. This is because the door modules 200D of Client 2 is installed at an entrance of office and the items stored therein should be more limited than the MFP 200C. The door module 200D of Client 3 can store more items than the door module 200D of Client 2, because it is installed inside the office and security is ensured. However, the cache amount of the door module 200D of Client 3 is restricted to "4096 KB" due to restriction of hardware.

The individual PC 200B of Client 4 stores the items less than those stored in the MFP 200C and the shared PC 200A of Client 5, because the individual PC 200B can be brought out by a user to the outside of a local network environment and it is more difficult to ensure security. The shared PC 200A can store items as much as those stored in the MFP 200C, because the shared PC 200A is installed inside the office and security is ensured.

[User-Specific Information to be Stored as Cache Data]

In one or more embodiments, the process to determine and store the items of the user-specific information by the authentication server 100 and the client devices 200 will be described. As a result of the process, the user-specific information stored as the cache data can be customized depending on the function/intended use of each of the client devices 200.

Figure 12:
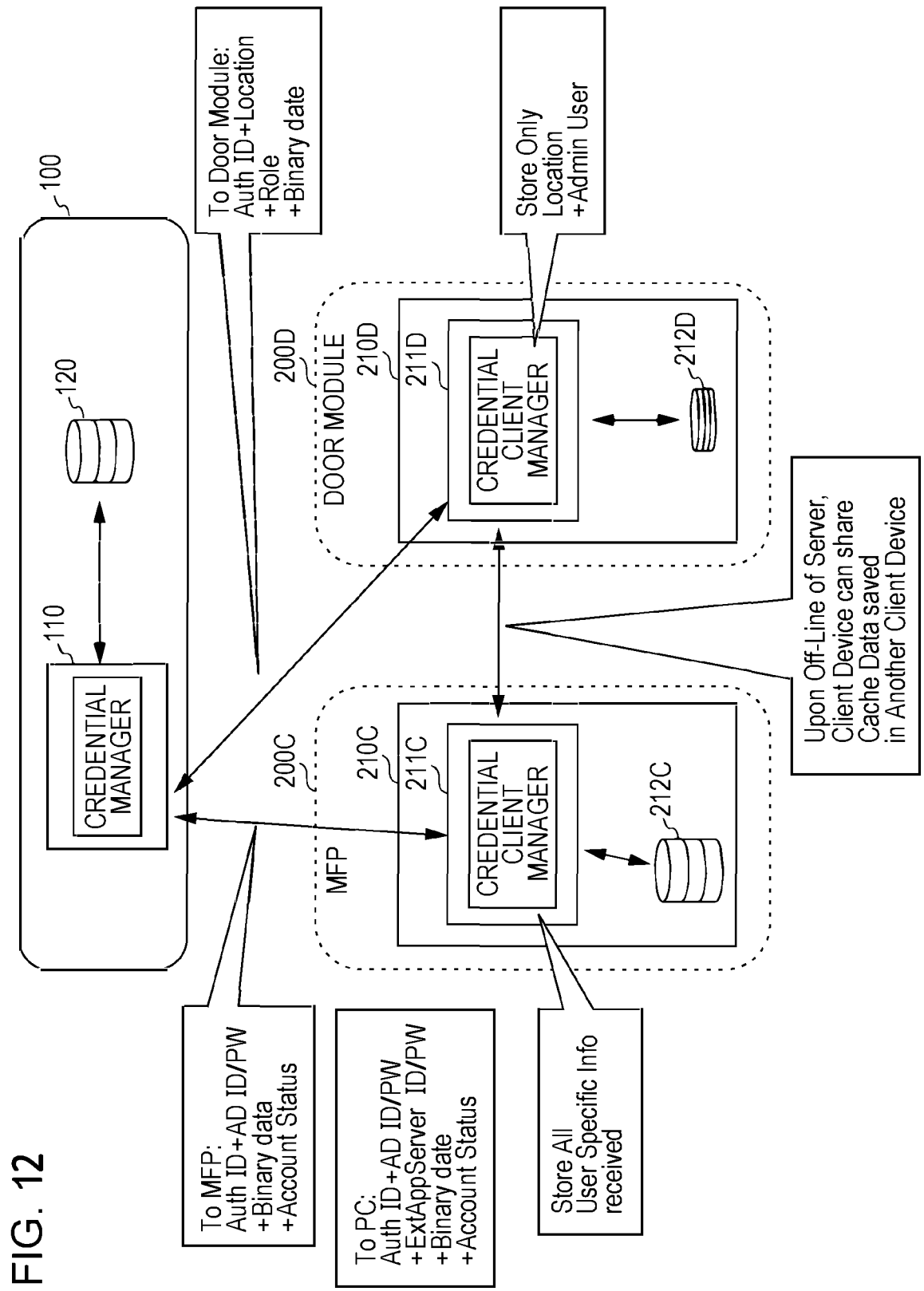
FIG. 12 is a diagram showing a process to determine and store the items of the user-specific information according to one or more embodiments.

FIG. 12 is a diagram showing the process to determine and store the items of the user-specific information, according to one or more embodiments.

As illustrated in FIG. 12, the processor 110 determines for the MFP 200C, from the items of the user-specific information illustrated in FIG. 9, items of (1) authentication ID, (2) credential data (e.g., user ID and user password), (3) authentication data (e.g., binary data of fingerprint), and (4) account status data. As shown in FIG. 12, the MFP 200C stores all of the determined items of the user-specific information. Alternatively, the MFP 200C may store a part of the determined items.

Meanwhile, for the individual PC 200B, the processor 110 determines items of (1) authentication ID, (2) credential data (e.g., user ID and user password for AD server 300), (3) credential data (e.g., user ID and user password for the external application servers EAS1, EAS2), (4) authentication data (e.g., binary data of fingerprint), and (5) account status data.

For the door module 210D, the processor 110 determines items of (1) authentication ID, (2) user property data (e.g., location where a user lives), (3) user property data (e.g., role of a user in a company), and (4) authentication data (e.g., binary data of face image). As shown in FIG. 12, the door module 210D stores only the user property data (e.g., location where a user lives) and the authentication ID of the admin users, from among the determined items of the user-specific information. Alternatively, the door module 210D may store all of the determined items.

[Cache Data Saved in Client Device]

As a result of the above process, each of the client devices 200 stores the items of the user-specific information as the cache data. FIG. 13A is a table showing the cache data stored in the MFP 200C according to one or more embodiments. FIG. 13B is a table showing the cache data stored in the door module 210D according to one or more embodiments.

As shown in FIGS. 14A and 14B, the MFP 200C stores the cache data of 50 persons, while the door module 210D stores the cache data of 250 persons, as set in the client-specific information illustrated in FIG. 11. Both of the MFP 200C and the door module 210D store the items of the authentication ID, user property data, account status data; credential data; and authentication data. In this regard, however, the door module 210D does not store the sub-item of the binary data of fingerprint according to the setting in the client-specific information illustrated in FIG. 11.

In one or more embodiments, the processor 110 monitors the number of use times of the cache memory, and when the number of use times exceeds an upper limited value, erases the cache data saved in the cache memory. The number of usable times depends on the hardware configuration and/or the intended use of each of the client devices 200. The upper limited value may be previously stored in the storage 120 of the authentication server 100. The processor 110 may erase the cache data from the oldest one, or from the newest one.

In one or more embodiments, the cache data saved in each of the cache memory can be shared among the client devices 200 via the LAN 500. When the authentication server 100 is disconnected from the communication network 400, one client device 200 (e.g., the door module 200D) may execute an interpolation control by acquiring the cache data from the cache memory of another client device 200 based on pre-constructed client mutual information including an IP address and a type of client device. According to the interpolation control, the one client device 200 can obtain, from the another client device 200, the cache data that the one client devices did not originally have. For example, the door module 200D can acquire the binary data of fingerprint from the cache memory of the MFP 200C.

In one or more embodiments, one or more of the client devices 200 may have the cache amount of zero (0). Even in this case, one client device 200 having the cache amount of zero can acquire the cache data from the cache memory of another client device 200. The client devices 200 may have the same cache amount or the different cache amount.

In one or more embodiments, the processor 110 of the authentication server 100 compares the cache data saved in one client device 200 with the cache data saved in another client device 200, and if a part or all of the cache data overlap with each other, erases the overlapped cache data from the one client device 200 or the another client device 200.

In one or more embodiments, the processor 110 of the authentication server 100 compares the cache data saved in one client device 200 with the cache data saved in another client device 200, and if a part or all of the cache data overlap with each other, sets the expiration period to be longer or shorter than a reference period.

In one or more embodiments, the processor 110 of the authentication server 100 obtains the expiration period from any one of the client devices 200, and if the account has become invalid or the expiration period has expired, prohibits the one of the client devices 200 from logging into the client devices 200 and/or the target services.

In one or more embodiments, the processor 110 of the authentication server 100 can set the number of times of authentication and which items of the user-specific information is required for the authentication, depending on the device-attribute information. In one or more embodiments, the authentication server 100 requires input of the binary data of finger print for the MFP 200C, while requiring input of the binary data of face image for the door module 200D installed at an entrance of office, as illustrated in FIG. 10. In one or more embodiments, the authentication server 100 requires two times of authentication (e.g., input of the binary data of fingerprint and input of PIN code) for the door module 200D which is installed at an entrance of a server room and requires higher security than other client devices 200, while only once for the door module 200D installed at the entrance of office (e.g., input of the binary data of face image) or for the MFP 200C (e.g., input of the binary data of fingerprint).

Although the processor 110 of the authentication server 100 determines the items of the user-specific information saved as the cache data based on the device-attribute information or user-attribute information in the above embodiments, it is also possible to determine the items based on service related information including service type, service contents, etc.

Although each of the client devices 200 comprises the cache memory in the above embodiments, a cloud storage can also be used as the cache memory in one or more embodiments.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

The invention claimed is:

1. An authentication server that connects a client device and
   a target server via a first network and provides the client device with data for
   logging into at least one of the client device and a target service provided by the target server, the authentication server comprising:
   a storage that stores:
   user-specific information acquired from at least one of the client device and the target server, wherein the user-specific information includes a plurality of data items
      comprising:
      an authentication ID;
   user property data;
   user authority data indicating a user authority to access the client device or the target service; and
   credential data used for authentication,
   device-attribute information associated with the user-specific information and including a kind of the client device, and
   user-attribute information; and
   a processor that:
   upon receiving from the client device an authentication request including at least one of a user ID, an authentication ID, a biometric device ID unique to a user, and biometric data of a user, identifies a corresponding credential data of the user;
   determines a cache amount for the client device based on the device-attribute information of the client device;
   determines, based on the cache amount, which of the items in the user-specific information will be sent to the client device;
   returns the determined items to the client device, and causes the client device to store the determined items as cache data used for logging into at least one of the client device and the target service, wherein the client device and the target server have given a login authority to the user; and
   changes the cache amount based on the user-attribute information.

2. The authentication server according to claim 1, wherein the items further comprise account status data indicating validity and an expiration period of a user account.

3. The authentication server according to claim 1, wherein the client device is a multi-function peripheral (MFP), door module, personal computer (PC), Internet of Things (IoT) device, or cellular phone.

4. The authentication server according to claim 1, wherein the storage further stores login requirement indicating which of the items in the user-specific information the client device needs for logging into the client device and the target service, and
the processor changes the cache amount based on the login requirement.

5. The authentication server according to claim 4, wherein the login requirement further indicates a number of times of authentication required for logging into the client device and the target service.

6. The authentication server according to claim 1, wherein the authentication server is connected to a plurality of client devices via the first network, where the client devices are connected to each other via a second network,
the client devices share the cache data, and
the processor further:
compares the cache data of one of the devices with the cache data of another of the devices, and
if a part or all of the cache data overlap with each other, erases the overlapped cache data from the one or another of the devices.

7. The authentication server according to claim 1, wherein the authentication server is connected to a plurality of client devices via the first network, where the client devices are connected to each other via a second network,
the client devices share the cache data, and
the processor further:
compares the cache data of one of the devices with the cache data of another of the devices, and
if a part or all of the cache data overlap with each other, sets the expiration period of the cache data of one of the devices to be longer than the expiration period of the cache data of another of the devices.

8. The authentication server according to claim 1, wherein the authentication server is a cloud server.

9. An authentication system comprising:
a client device;
a biometric authentication device connected to the client device; and
an authentication server that manages authentication for logging into at least one of the client device and a target service provided by a target server via a first network,
an authentication server comprising;
a storage that stores
user-specific information acquired from at least one of the client device and the target server, wherein the user-specific information includes a plurality of data items comprising:
an authentication ID;
user property data;
user authority data indicating a user authority to access the client device or the target service; and
credential data used for authentication, device-attribute information associated with the user-specific information
and including to a kind of the client device, and user-attribute information; and
a processor that:
upon receiving from the client device an authentication request including at least one of a user ID, an authentication ID, a biometric device ID unique to a user, and biometric data of a user, identifies a corresponding credential data;
determines a cache amount for at least one of the biometric authentication device and the client device based on the device-attribute information of the client device;
determines, based on the cache amount, which of the items in the user-specific information will be sent to at least one of the biometric authentication device and the client device;
returns the determined items to at least one of the biometric authentication device and the client device; and
changes the cache amount based on the user-attribute information,
wherein at least one of the biometric authentication device and the client device stores or updates cache data used for logging into at least one of the client device and the target service, upon receiving the determined items from the authentication server.

10. An authentication system according to claim 9, wherein
the items further comprise account status data indicating validity and an expiration period of a user account.

11. An authentication system according to claim 10, wherein
the storage further stores login requirement indicating which of the items in the user-specific information the client device needs for logging into the client device and the target service, and
the processor changes the cache amount based on the login requirement.

12. An authentication system according to claim 11, wherein
the login requirement further indicates a number of times of authentication required for logging into the client device and the target service.

13. An authentication system according to claim 11, wherein
the client device is a multi-function peripheral (MFP), door module, personal computer (PC), Internet of Things (IoT) device, or cellular phone.

14. An authentication system according to claim 11, wherein
the authentication server is connected to a plurality of client devices via the first network, where the client devices are connected to each other via a second network,
the client devices share the cache data, and
the processor further:
compares the cache data of one of the devices with the cache data of another of the devices, and
if a part or all of the cache data overlap with each other, erases the overlapped cache data from the one or another of the devices.

15. An authentication system according to claim 11, wherein
the authentication server is connected to a plurality of client devices via the first network, where the client devices are connected to each other via a second network, the client devices share the cache data, and
the processor further:
> compares the cache data of one of the devices with the cache data of another of the devices, and
> > if a part or all of the cache data overlap with each other, sets the expiration period of the cache data of one of the devices to be longer than the expiration period of the cache data of another of the devices.

16. An authentication system according to claim 11, wherein the authentication server is a cloud server.

17. An authentication method using an authentication system that comprises a client device, a biometric authentication device connected to the client device, and an authentication server comprising a processor and a storage, and managing authentication for logging into at least one of the client device and a target service provided by a target server via a first network, the method comprising:

storing, in the storage,
user-specific information acquired from at least one of the client device and the target server, wherein the user-specific information includes a plurality of data items comprising:
> an authentication ID;

user property data;
user authority data indicating a user authority to access the client device or the target service; and
credential data used for authentication,
device-attribute information associated with the user-specific information and including to a kind of the client device, and
user-attribute information;
upon receiving from the client device an authentication request including at least one of a user ID, an authentication ID, a biometric device ID unique to a user, and biometric data of a user, identifying, by the processor, a corresponding credential data of the user;
determining a cache amount for at least one of the biometric authentication device and the client device based on the device-attribute information of the client device;
determining, based on the cache amount, which of the items in the user-specific information will be sent to at least one of the biometric authentication device and the client device;
returning, by the processor, the determined items to at least one of the biometric authentication device and the client device;
changing, by the processor, the cache amount based on the user-attribute information; and
storing or updating, by at least one of the biometric authentication device and the client devices, cache data used for logging into at least one of the client device and the target service, upon receiving the determined items from the authentication server.

* * * * *